US012615236B2

(12) United States Patent
Patnala et al.

(10) Patent No.: US 12,615,236 B2
(45) Date of Patent: Apr. 28, 2026

(54) HIGH-FIDELITY EVENT DATA FOR MULTI-CLOUD SERVICES

(71) Applicant: Cisco Technology, Inc., San Jose, CA (US)

(72) Inventors: Praveen Kumar Patnala, Santa Clara, CA (US); Ganesh Narayanaswamy, Sunnyvale, CA (US); Mark Landgrebe, Marina Del Rey, CA (US)

(73) Assignee: Cisco Technology, Inc., San Jose, CA (US)

( * ) Notice: Subject to any disclaimer, the term of this patent is extended or adjusted under 35 U.S.C. 154(b) by 56 days.

(21) Appl. No.: 18/659,759

(22) Filed: May 9, 2024

(65) Prior Publication Data

US 2025/0193250 A1      Jun. 12, 2025

Related U.S. Application Data

(60) Provisional application No. 63/609,196, filed on Dec. 12, 2023.

(51) Int. Cl.
*H04L 9/40*          (2022.01)
*G06F 12/0802*          (2016.01)
(Continued)

(52) U.S. Cl.
CPC ...... *H04L 63/0263* (2013.01); *G06F 12/0802* (2013.01); *H04B 10/25* (2013.01);
(Continued)

(58) Field of Classification Search
CPC . H04L 63/0263; H04L 9/0861; H04L 9/3242; H04L 9/3247; H04L 41/16;
(Continued)

(56) References Cited

U.S. PATENT DOCUMENTS 8,918,371 B1    12/2014  Prikhodko et al.
11,374,982 B1 *   6/2022  Keren ................... G06F 21/577
(Continued)

FOREIGN PATENT DOCUMENTS

WO      WO-2024102856 A1 *   5/2024  ............... H04L 9/50
WO      WO-2024227182 A1 *  10/2024  ........... H04L 63/107

OTHER PUBLICATIONS

Huo et al, AutoLog: A log sequence Synthesis Framework for Anomaly Detection, 2023 IEEE/ACM International Conference on Automated Software Engineering (ASE), p. 497-509 (Year: 2023).*

*Primary Examiner* — Christopher A Revak
(74) *Attorney, Agent, or Firm* — Polsinelli P.C.

(57)          ABSTRACT

Disclosed are systems, apparatuses, methods, and computer-readable media for high-fidelity event data for multi-cloud services. A method includes: storing first event information of a multi-cloud service in a cache, wherein the first event information is received from a first gateway controlled by the controller; storing second event information of the multi-cloud service in the cache, wherein the second event information is received from a first external service; mapping the second event information to the first event information to at least one identifier associated with the controller; and generating a first synthesized event information based on mapping the second event information to the first event information, the first synthesized event information including the at least one identifier, at least one event from the first event information, and at least one event from the second event information.

20 Claims, 11 Drawing Sheets

900 —

Storing First Event Information Of A Multi-Cloud Service In A Cache, Wherein The First Event Information Is Received From A First Gateway Controlled By The Controller — 902

Storing Second Event Information Of The Multi-Cloud Service In The Cache, Wherein The Second Event Information Is Received From A First External Service — 904

Mapping The Second Event Information To The First Event Information To At Least One Identifier Associated With The Controller — 906

Generating A First Synthesized Event Information Based On Mapping The Second Event Information To The First Event Information — 908

After A Period Of Time, Storing The First Synthesized Event Information In A Storage System — 910

When The First Synthesized Event Is Stored, Removing The First Event Information, The Second Event Information, And The First Synthesized Event Information From The Cache — 912

(51) Int. Cl.

| | |
|---|---|
| *G06F 16/23* | (2019.01) |
| *G06F 16/27* | (2019.01) |
| *H04B 10/25* | (2013.01) |
| *H04L 9/08* | (2006.01) |
| *H04L 9/32* | (2006.01) |
| *H04L 41/16* | (2022.01) |
| *H04L 67/1008* | (2022.01) |
| *H04Q 11/00* | (2006.01) |

(52) U.S. Cl.
CPC .......... *H04L 9/0861* (2013.01); *H04L 9/3242* (2013.01); *H04L 9/3247* (2013.01); *H04L 41/16* (2013.01); *H04L 63/0227* (2013.01); *H04L 63/0236* (2013.01); *H04L 63/083* (2013.01); *H04L 63/10* (2013.01); *H04L 63/1416* (2013.01); *H04L 63/1425* (2013.01); *H04L 63/145* (2013.01); *H04L 63/20* (2013.01); *H04L 67/1008* (2013.01); *H04Q 11/0066* (2013.01); *G06F 16/2365* (2019.01); *G06F 16/27* (2019.01); *H04L 63/166* (2013.01)

(58) Field of Classification Search
CPC ... H04L 63/0236; H04L 63/083; H04L 63/10; H04L 63/1416; H04L 63/1425; H04L 63/145; H04L 63/20; H04L 67/1008; H04L 63/166; H04L 41/0895; H04L 63/0227; H04L 67/02; G06F 12/0802; G06F 16/2365; G06F 16/27; H04B 10/25; H04Q 11/0066

See application file for complete search history.

(56) References Cited

U.S. PATENT DOCUMENTS

| | | | |
|---|---|---|---|
| 11,516,069 | B1 | 11/2022 | Satish et al. |
| 11,922,222 | B1 * | 3/2024 | Chawla .................. G06F 9/5077 |
| 12,309,185 | B1 * | 5/2025 | Skarphedinsson .... H04L 67/535 |
| 2017/0085447 | A1 * | 3/2017 | Chen ..................... H04L 43/024 |
| 2018/0006913 | A1 * | 1/2018 | Asenjo ................ H04L 41/0856 |
| 2018/0302853 | A1 * | 10/2018 | Chandra ............. H04L 67/1095 |
| 2020/0092391 | A1 | 3/2020 | Poydence et al. |
| 2020/0167323 | A1 * | 5/2020 | Swamy ................. G06F 16/256 |
| 2021/0136170 | A1 * | 5/2021 | Katre .................. H04L 41/0853 |
| 2021/0192867 | A1 * | 6/2021 | Fang .................... G07C 5/0816 |
| 2021/0209228 | A1 | 7/2021 | Maor et al. |
| 2021/0281650 | A1 | 9/2021 | George et al. |
| 2022/0353975 | A1 * | 11/2022 | Ma ...................... H04N 21/4131 |
| 2023/0388352 | A1 * | 11/2023 | Gilad .................. H04L 63/1416 |
| 2025/0184358 | A1 * | 6/2025 | Ghosh .................... H04L 41/16 |

* cited by examiner

800

| Timestamp | Source Address | Destination | Request | Country | Security | Database Info | CSP | Request # | Confidence |
|---|---|---|---|---|---|---|---|---|---|
| 0290 | 132.25.5.12 | 132.25.(4-13).0/8 | HTTP2/* | US | Ok | Ok | 3 | 17 | 92% |
| 2097 | 4.25.0.(4-13)/8 | [8, 10].0.0.0/16 | HTTP2/Post | RU, TW | Deny | Injection | 1-4 | 67923 | 15% |
| 0298 | 67.158.(1-9).0/8 | 132.25.(4-13).0/8 | HTTP2/WS | US | Deny | Null in Array | 2 | 11911 | 35% |
| 0303 | 69.0.0.0/24 | 132.25.(4-13).0/8 | HTTP2/* | US | Ok | Ok | 3 | 6700 | 89% |
| 0308 | 92.1.10.0/8 | 132.25.(4-13).0/8 | HTTP2/* | US | Ok | Ok | 1 | 679 | 89% |
| 0311 | 2.32.11.0/8 | 132.25.(4-13).0/8 | HTTP2/* | US | Warn | Ok | 1 | 98 | 93% |

Third-party Service Data 804

Synthesized Data 806

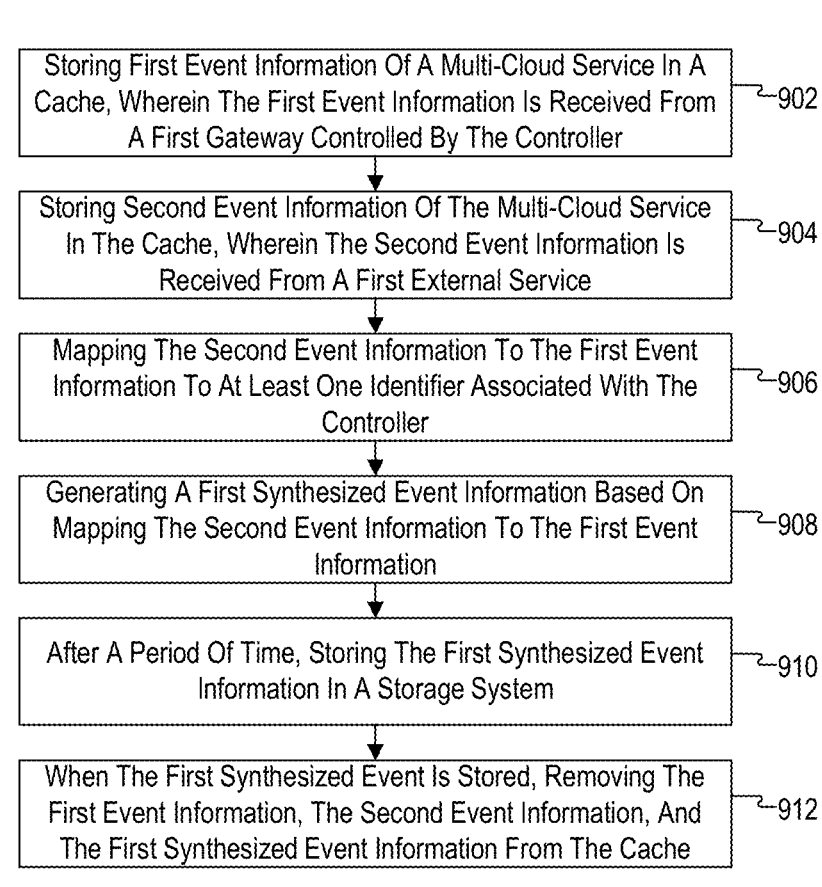

Storing First Event Information Of A Multi-Cloud Service In A Cache, Wherein The First Event Information Is Received From A First Gateway Controlled By The Controller ⌐~902

Storing Second Event Information Of The Multi-Cloud Service In The Cache, Wherein The Second Event Information Is Received From A First External Service ⌐~904

Mapping The Second Event Information To The First Event Information To At Least One Identifier Associated With The Controller ⌐~906

Generating A First Synthesized Event Information Based On Mapping The Second Event Information To The First Event Information ⌐~908

After A Period Of Time, Storing The First Synthesized Event Information In A Storage System ⌐~910

When The First Synthesized Event Is Stored, Removing The First Event Information, The Second Event Information, And The First Synthesized Event Information From The Cache ⌐~912

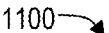
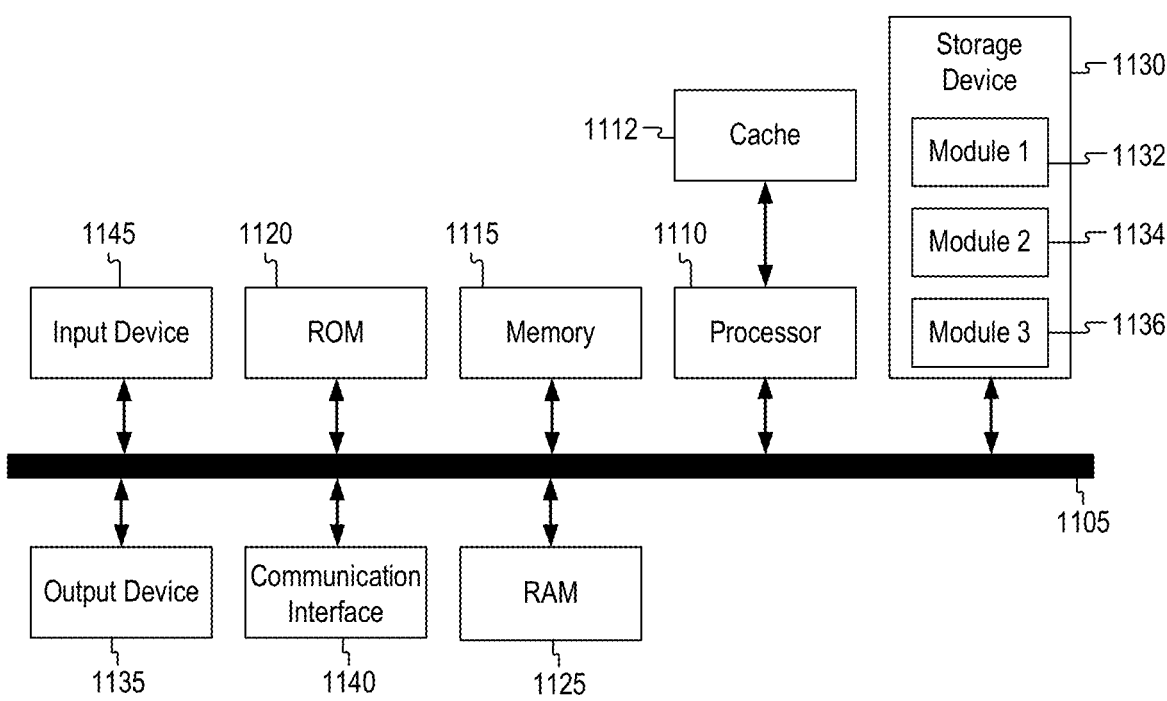
FIG. 11

HIGH-FIDELITY EVENT DATA FOR MULTI-CLOUD SERVICES

CROSS-REFERENCE TO RELATED APPLICATION

This application claims priority to U.S. Provisional Application No. 63/609,196 filed on Dec. 12, 2023, the entire content of which is incorporated herein by reference.

TECHNICAL FIELD

The disclosure relates generally to cloud networking and, more specifically but not exclusively, to systems and techniques for high-fidelity event data for multi-cloud services.

BACKGROUND

Public clouds are third-party, off-premises cloud platforms that deliver computing resources, such as virtual machines, storage, and applications, over the Internet. Services provided by public cloud providers, such as Amazon Web Services (AWS), Microsoft Azure, and Google Cloud Platform, are shared among multiple customers. Public clouds offer scalability, cost efficiency, and flexibility as organizations can access and pay for resources on a pay-as-you-go model. Pay-as-you-go is particularly beneficial for customers with fluctuating workloads and enables enterprises to scale resources up or down based on demand. However, the shared nature of public clouds raises considerations regarding security, compliance, and data privacy, and customers need to carefully evaluate their specific requirements and choose appropriate providers.

Many customers also have private clouds, which are dedicated infrastructure that is either on-premises or hosted by a third-party. Private clouds are designed exclusively for a single customer, providing greater control over resources and data. Private clouds are suitable for entities with stringent security and compliance requirements, allowing the entities to customize and manage the infrastructure according to specific needs. Entities use private clouds to retain control over critical business applications, sensitive data, or when regulatory compliance mandates demand a higher level of data governance.

Hybrid and multi-cloud approaches have become popular to adapt to the benefit of public and private clouds. Hybrid clouds allow organizations to enjoy the scalability of public clouds while retaining certain workloads in a private, more controlled environment. Multi-cloud strategies involve using services from multiple public cloud providers, offering redundancy, flexibility, and the ability to choose the best-suited services for specific tasks.

BRIEF DESCRIPTION OF THE DRAWINGS

In order to describe the manner in which the above-recited and other advantages and features of the disclosure may be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8 is a conceptual illustration of an example of synthesized data in accordance with some aspects of the disclosure;

FIG. 9 illustrates an example method for high-fidelity event data for multi-cloud services in accordance with some aspects of the disclosure;

FIG. 11 shows an example of a computing system, which may be for example any computing device that may implement components of the system.

DESCRIPTION

Figure 1:
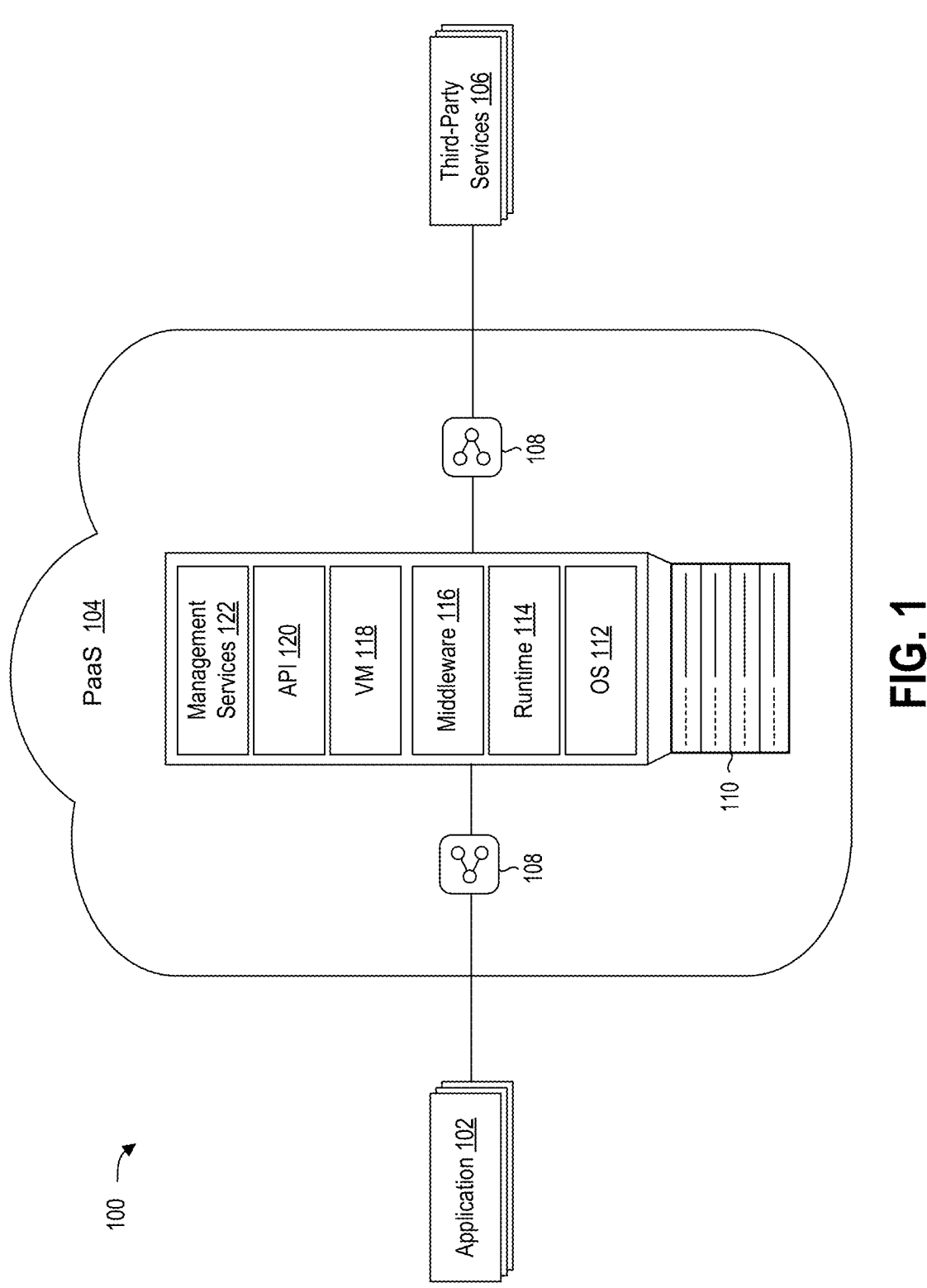
FIG. 1 is a conceptual diagram of a networking environment associated with a cloud security platform that integrates into different cloud providers in accordance with some aspects of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described to avoid obscuring the description. References to one or an embodiment in the present disclosure may be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims, or may be learned by the practice of the principles set forth herein.

Overview

Cloud network providers include various companies such as Google, Apple, Amazon, Microsoft, DigitalOcean, Vercel, Alibaba, Netlify, Redhat OpenShift, Oracle, and many other entities. Each cloud provider offers a range of services, from foundational infrastructure, which is referred to Infrastructure as a Service (IaaS), platforms for application development and deployment, which is referred to as platform as a service (PaaS), and fully managed software applications, which is referred to as software as a service (SaaS). Cloud providers maintain a network of geographically distributed data centers that host servers, storage, and networking equipment and allow customers to deploy resources in proximity to their target audience for improved performance and redundancy, including content delivery networks (CDN) and edge compute services.

Virtualization technology is a foundational aspect of cloud providers and enables the creation of virtual instances of servers, storage, and network resources within a geographic region. Cloud providers also deploy resource orchestration tools to manage the dynamic allocation and scaling of these virtual resources based on demand. Fundamentally, cloud providers establish robust, high-speed connections between their data centers and form a global network backbone. This backbone ensures low-latency communication and facilitates data transfer between different regions.

Conventional security within cloud providers deploy a range of security measures, including encryption, firewalls, identity and access management, and compliance certifications, to safeguard customer data and ensure the integrity of their services. Cloud services are designed to be elastic, allowing customers to dynamically scale resources up or down based on demand to handle varying workloads efficiently.

Cloud providers offer various managed services, such as databases, machine learning, analytics, runtimes, and other aspects that allow customers to leverage advanced functionalities without the need for deep expertise in those domains. Various application programming interfaces (APIs) can be exposed by a cloud provider that enables users to programmatically interact with and manage their resources and allow integration with third-party tools and the automation of various tasks.

Fundamentally, in past server architectures, a server was defined with a fixed internet protocol (IP) address. In cloud-based computing, IP addresses are dynamic and enable the resources within the cloud providers. Cloud environments require dynamic scaling to accommodate varying workloads and dynamic IP addresses allow for the automatic allocation and release of addresses as resources are provisioned or de-provisioned. The dynamic addresses also allow service elasticity to respond to increasing or decreasing resources, cost efficiency, automation and orchestration of tools within the cloud integration and deployment environment, load balancing, high availability and failover, adaptable network topology, and increase resource utilization.

Cloud security is a fundamental issue as customers typically may deploy resources and integrate into resources of different cloud providers. While the clouds have a generic infrastructure configuration with a spine network topology that routes traffic to a top-of-rack (TOR) switch and servers within the racks, clouds are still configured differently and have different requirements. For example, some cloud providers emphasize different geographical markets; cloud providers can emphasize different business segments (e.g., healthcare, government, etc.) and configure services according to their intended market.

Cloud security has become an important aspect of networking today because there are significant challenges. For example, data breaches are a significant concern in the cloud because unauthorized access to sensitive data, either through misconfigurations or cyberattacks, can lead to data exposure and compromise the confidentiality of information. Misconfigurations of cloud services, such as incorrectly configured access controls or insecure storage settings, can create vulnerabilities and may expose data to unauthorized users or attackers.

Another important aspect of cloud security is identity management. Improper management of user identities and access privileges can result in unauthorized access. Inadequate or improperly implemented encryption can lead to data exposure. This includes data in transit, data at rest, and data during processing. Ensuring end-to-end encryption is crucial for maintaining data confidentiality.

Cloud providers use shared infrastructure and technologies. If a vulnerability is discovered in a shared component, multiple clients could be affected simultaneously. Regular security updates and patches are essential to mitigate this risk, and there is an increased market for third-party services that integrate into cloud provider services.

Organizations may fail to conduct thorough due diligence when selecting a cloud service provider (CSP). Inadequate assessment of a provider's security measures, compliance standards, and data protection practices can result in security gaps.

The evolving landscape of cybersecurity introduces new threats and attack vectors. Cloud security solutions must continuously adapt to address emerging threats, such as zero-day vulnerabilities and advanced persistent threats (APTs). These attacks can come from many different sources, and monitoring these threats can be too difficult for entities.

The cloud is dynamic, connected, and encrypted. Customers of cloud providers primarily care about their business operations and not the infrastructure behind the business operations. In the current environment, customers of CSPs need to implement instruction protection services (IPS), instruction detection services (IDS), web application firewalls (WAF), as well as provide egress security. Customers may also need to implement data loss prevention services (DLP) to comply with sensitive information requirements.

Dynamic IP addresses are necessary for cloud-based services and provide the flexibility and scalability to meet the dynamic demands of modern applications. In cloud environments, resources are often provisioned and de-provisioned dynamically based on workload requirements. Dynamic IP addresses allow cloud service providers to efficiently allocate and manage IP addresses at runtime to optimize resource utilization and reduce operational overhead. This dynamic allocation ensures that resources are not tied to specific IP addresses permanently, enabling efficient resource allocation and reallocation as needed.

However, dynamic IP addresses can present challenges, particularly in maintaining consistent network access and security. Since IP addresses can change frequently, managing access controls and maintaining secure communication between services becomes more complex. Applications relying on static IP addresses for configuration or security purposes may encounter disruptions or vulnerabilities when IP addresses are dynamically reassigned. In many cases, clients resolve the address of a target service due to the dynamic nature of resources in the cloud.

Disclosed are systems, apparatuses, methods, computer readable medium, and circuits for high-fidelity event data for multi-cloud services. The disclosed systems and techniques can dynamically map data at run time and connect different components of a multi-cloud service to generate high-fidelity log information that is rich with metadata and can be analyzed with higher accuracy than conventional logs.

According to at least one example, a method for zero-trust IP address resolution in cloud services is disclosed. The method includes: storing first event information of the multi-cloud service in a cache, wherein the first event information is received from a first gateway controlled by a controller; storing second event information of the multi-cloud service in the cache, wherein the second event information is received from a first external service; mapping the second event information to the first event information to at least one identifier associated with a controller; and generating a first synthesized event information based on mapping the second event information to the first event information, the first synthesized event information including the at least one identifier, at least one event from the first event information, and at least one event from the second event information.

In another example, a firewall of a cloud security platform for configuring resources of a service distributed across multiple cloud service providers is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the one or more processors to: store first event information of the multi-cloud service in a cache, wherein the first event information is received from a first gateway controlled by a controller; store second event information of the multi-cloud service in the cache, wherein the second event information is received from a first external service; map the second event information to the first event information to at least one identifier associated with a controller; and generate a first synthesized event information based on mapping the second event information to the first event information, the first synthesized event information including the at least one identifier, at least one event from the first event information, and at least one event from the second event information.

Example Embodiments

FIG. 1 is a conceptual diagram of a networking environment 100 associated with a cloud security platform that integrates into different cloud providers according to some aspects of the disclosure. In some aspects, the networking environment 100 includes a plurality of applications 102 that are connected to a cloud security platform 104 that is configured for various aspects of cloud security. The cloud security platform 104 comprises a compute layer that is configured to discover applications and network resources, deploy cloud-based firewalls and management, and provide multi-cloud policy and control from a single endpoint.

The applications 102 include various forms, such as distributed cloud-based applications, edge-based applications (e.g., webapps), desktop-based applications, mobile phone applications, and so forth. The third-party services 106 include various services, such as cloud service providers and other services that are integrated into the cloud security platform 104. For example, the cloud security platform 104 may be configured to use different services for specialty functions that are consistent for each customer of the cloud security platform 104. Non-limiting examples of different services include various types of communication services (e.g., mail servers, communication platforms, etc.), security-oriented services (e.g., monitoring services such as Splunk), search services, storage services (e.g., relational databases, document databases, time-series databases, graph databases, etc.), authentication services, and so forth.

The cloud security platform 104 is configured to be deployed within various infrastructure environments in a PaaS manner. The cloud security platform 104 includes networking infrastructure 108 for connecting the application 102 to the cloud security platform 104. The cloud security platform 104 includes a plurality of servers 110 that are geographically distributed, with each server 110 being managed by with various operating systems (OS) 112, runtimes 114, middleware 116, virtual machines (VM) 118, APIs 120, and management services 122. In some aspects, the cloud security platform 104 includes a runtime 114 refers to the environment that the middleware 116 will execute within to control various aspects of the cloud security platform 104. For example, the VMs 118 may be Kubernetes containers and the middleware 116 may be configured to add or remove hardware resources within cloud providers dynamically.

The cloud security platform 104 also exposes one or more APIs 120 for allowing the applications 102 to interact with the cloud security platform 104. The APIs 120 enable a customer to surface information, interact with information within the cloud security platform 104, and perform other low-level functions to supplement the security services of the cloud security platform 104. The API 120 is also configured to integrate with other third-party services (e.g., the third-party service 106) to perform various functions. For example, the API 120 may access a customer's resources in a cloud service provider (e.g., a third-party service 106) to monitor for threats, analyze configurations, retrieve logs, monitor communications, and so forth. In one aspect, the API 120 integrates with third-party cloud providers in an agnostic manner and allows the cloud security platform 104 to perform functions dynamically across cloud providers. For example, the API 120 may dynamically scale resources, allow resources to join a cluster (e.g., a cluster of controller instances), implement security rules from the cloud security platform 104 into the corresponding cloud provider, and other functions that enable a cloud-agnostic and service-agnostic integrated platform. For example, in some cases, the API 120 is configured to integrate with other security services to retrieve alerts of specific assets to reduce exposure to malicious actors.

The cloud security platform 104 also includes management services 122 for managing various resources of a customer. In some aspects, the management services 122 can manage resources including a controller (e.g., the controller 210 in FIG. 2), data resources (e.g., a data plane 270 in FIG. 2), and various integrations (e.g., a gateway 250, third-party services 252, cloud providers 254 in FIG. 2). For example, the management services 122 may allow the customer to manage various third-party resources such as a cloud-based relational database, a cloud-based document database, a cloud-based storage service (e.g., various implementations of the S3 API) and so forth.

In one aspect, the management services 122 include an onboarding user experience that connects to various cloud providers (e.g., using the API 120) and allows onboarding of different cloud resources. The management services 122 also provides a cloud-agnostic approach to managing resources across different cloud providers, such as scaling up identical resources in different regions using different cloud providers. As an example, some cloud providers do not have a significant presence in the Far East, and the management services 122 are configured to activate similar resources in a first geographical region (e.g., in Europe) and a second geographical region (e.g., Asia) with similar configurations in different cloud providers.

The cloud security platform 104 is configured to provide security across and within cloud providers in different contexts. For example, the cloud security platform 104 provides protection and security mechanisms in different flows. The cloud security platform 104 is configured to provide varying levels of protection based on flow, packet, encryption and other mechanisms. In one aspect, the cloud security platform 104 is configured to protect forwarding flows and packet flows.

Forwarding flow refers to the set of rules and decisions that determine how network devices handle incoming packets without inspecting packet and traffic contents. A forwarding flow involves making decisions based on information such as destination IP address, media access control (MAC) address, and routing tables to determine the outgoing interface for the packet and typically includes actions like address resolution (e.g., an address resolution protocol (ARP) for IP to MAC address mapping), updating MAC tables, and forwarding the packet to the appropriate interface, and various rules to apply based on configuration and policies.

A proxy flow comprises both forward proxy and reverse proxy functions and inspects the content of encrypted flows and access control. In some aspects, the cloud security platform 104 decrypts encrypted traffic to ensure malicious actors are not exploiting vulnerabilities in TLS-encrypted applications, and prevents data exfiltration (e.g., DLP) or connection to inappropriate universal resource indicators (URIs).

The cloud security platform 104 is also configured to handle packets differently based on security, such as policies related to IPS and a WAF. WAF protects various web applications from online threats, such as SQL injection, cross-site scripting (XSS), authentication spoofing, and other potential security. For example, a WAF filters and monitors traffic by inspecting headers (e.g., a JSON-encoded object in a hypertext transfer protocol (HTTP) header).

The cloud security platform 104 provides real-time discovery of multi-cloud workloads, at-scale, for virtual private clouds (VPCs) and cloud accounts. Real-time discovery also enables finding security gaps and improving defensive posture. The cloud security platform 104 also provides a data-plane management using gateways (e.g., the gateway 250 in FIG. 2) that provides self-healing via in-band/transparent diagnostics), seamless upgrade (e.g., no downtime or user intervention), and auto-scaling. The cloud security platform 104 may implement a containerized service (e.g., Kubernetes) to enable scale out deployments with a high service level agreement (SLA) without having to maintain network security infrastructure and integrate with cloud-native networking to enable automation of distributed and centralized (hub-n-spoke) architectures for ingress, egress, east-west (including microsegmentation) and hybrid cloud configurations. The cloud security platform 104 maintains traffic within cloud account boundaries and customers retain control of their private encryption keys without needing to share encryption keys with the control plane (e.g., the controller 210 of FIG. 2).

Figure 2:
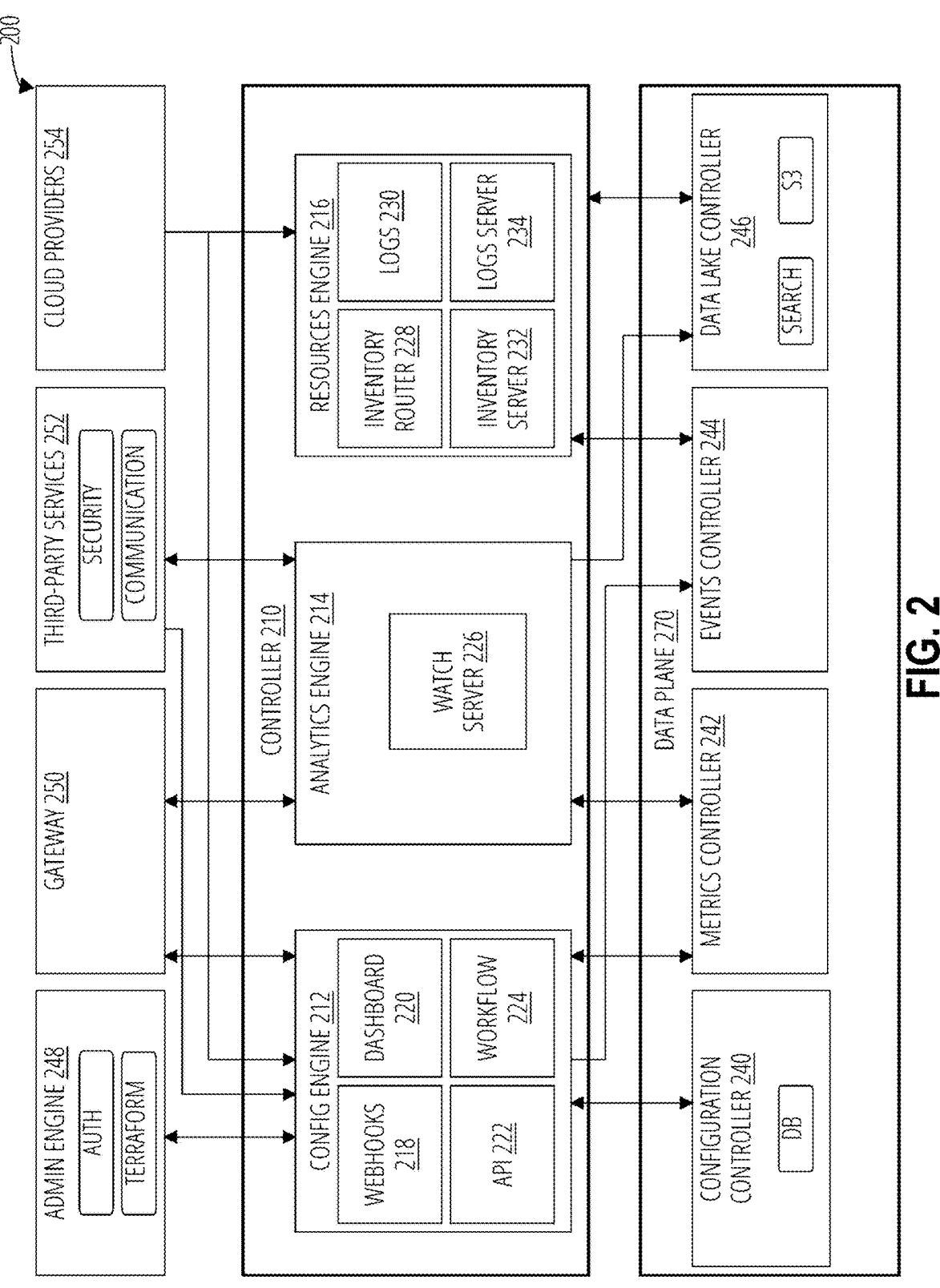
FIG. 2 is a conceptual diagram of a cloud security platform that integrates into different cloud service providers in accordance with some aspects of the disclosure.

FIG. 2 is a conceptual diagram of a cloud security platform that integrates into different cloud service providers in accordance with some aspects of the disclosure.

In some aspects, the cloud security platform 200 separates compute and data storage functions and enables a multi-tenancy to support different customers while maintaining data separation when needed. For example, the compute components are separated into a controller 210 and data storage components are implemented in a data plane 270. The controller 210 may be a collection of Kubernetes-based services that deploy a low latency connection (e.g., a remote procedure call (RPC) such as gRPC, Websockets, WebTransport, etc.) to connect various endpoints and enable bidirectional streaming, preventing connection setup and teardown. Each service within the controller 210 scales up or down horizontally based on load.

The controller 210 includes a configuration engine 212, an analytics engine 214, and a resources engine 216. The configuration engine 212 configures the various components and provides various services such as webhooks 218, a dashboard 220, an API 222, and a workflow 224.

In one aspect, the webhooks 218 module configures an asynchronous method of communication between different applications or services in real-time. In a webhook configuration, one application can register an endpoint URI with another, specifying where it should send data when a particular event occurs. When the event triggers, the originating system automatically pushes data to the registered URI, allowing the receiving application to process and act upon the information immediately. In some aspects, the webhooks 218 modules implement an observer pattern, with a dependent component providing a URI to the observed data source.

The dashboard 220 provides a user experience to a customer of the cloud security platform 104 and provides various integration modules, onboarding platforms, monitoring tools, and other functions for customers to access.

In some aspects, the APIs 222 can be various libraries to interact with various services, either through a dashboard 220 interface, a command line interface (not shown), or other tooling (not shown). The APIs 222 can also be API endpoints of the cloud security platform 104 or an API library associated with a third-party service (e.g., third-party services 252), or APIs associated with the cloud providers 254. In one aspect, the APIs 222 can include an agnostic API library that is configured to interact with the cloud providers 254 using a single API interface to scale resources, respond to security incidents, or other functions. This API 222 can be accessed via a command line interface or may be distributed to customers via various package management services.

The workflow 224 module can be various components that enable a customer to perform various tasks, such as managing specific resources, deploying services, communicating with team members regarding issues, and so forth. For example, the workflow 224 module can interact with the gateways 250 and an administration engine 248 to manage resources, access to resources, and deployment of various resources (e.g., deploy infrastructure with Terraform).

The analytics engine 214 is configured to integrate with gateways 250 and various third-party services 252 to monitor various events, services, and other operations. The analytics engine 214 includes a watch server 226 that is configured to disambiguate information from multiple sources of information (e.g., the gateway 250, the third-party services 252, etc.) to provide a holistic view of cloud networking operations. The analytics engine 214 may also be configured to interact with various components of the data plane 270 such as a metrics controller 242 and a data lake controller 246.

In some aspects, the resources engine 216 receives resources from cloud providers 254 and includes various components to route information and store information. The 216 includes an inventory router 228, logs 230 (e.g., a cache of logs for various functions), an inventory server 232, and a logs server 234. The components of the resources engine 216 are configured to disambiguate and combine information in an agnostic and standardized manner and store various resources in the data plane 270. For example, the resources engine 216 stores and receives events from an events controller 244 and also stores and receives logs in the data lake controller 246. In some aspects, the inventory router 228 and the inventory server 232 build an evergreen model of the customer's cloud accounts and subscriptions and create an address object for security policy management for the cloud security platform 200. The address object represents a segment of the customer's subscription based on cloud-native attributes (e.g., Security Group, ASG, customer-defined tags) and maps to a collection of IP Addresses which is automatically refreshed and synchronized with the gateway 250.

The data plane 270 includes various components to separate various types of information associated with the control plane and interconnected third-party services 252 and cloud providers 254. For example, the data plane 270 includes a configuration controller 240 that stores inventory information of a customer and various configuration information. In one example, the cloud providers 254 use different metrics for decisions pertaining to scaling deployed resources, and the configuration controller 240 stores information that allows the controller 210 to scale resources within the cloud providers 254 in a standardized manner. In some aspects, the configuration controller 240 may include storage mechanisms such as a relational database, a document database, and other high-availability storage mediums. The storage mechanisms can be on-premises resources or off-premises or cloud-based solutions such as various cloud-based relational or document databases (e.g., Redis, MySQL, MongoDB, etc.).

The data plane 270 also includes a metrics controller 242 that is configured to interact with custom metrics data or a third-party service for metrics analysis (e.g., Amazon Cloud-Watch). The events controller 244 is configured to handle and store events and various queues. For example, the events controller can include a Kafka server for handling real-time data feeds and event-driven applications. The metrics controller 242 may use a publish-subscribe model in which producers (e.g., a third-party service, internal components of the controller 210, a gateway 250, etc.) publish data streams and a consumer subscribes to receive and process these streams in a fault-tolerant and distributed manner. The metrics controller 242 may handle massive amounts of data with low latency and high throughput.

The data lake controller 246 provides a long-term and scalable storage mechanism and associated services. For example, the data lake controller 246 may include a cloud-based S3 API for storing data to various cloud services (e.g., amazon web services (AWS), DigitalOcean, OpenShift) or on-premises services (e.g., MinIO, etc.). The data lake controller 246 may also include a search-based mechanism such as ElasticSearch for large-scale and efficient search of contents within the non-volatile cloud storage mechanisms. In some aspects, the data lake controller 246 stores network logs and implements search functionality (e.g., Snowflake) for large-scale ad hoc queries for security research and analysis.

The cloud security platform 200 also includes an administration engine 248, a gateway 250, and integrations into various third-party services 106. The administration engine 248 may include authentication services (e.g., Auth0, Okta) to verify identity and provide authentication mechanisms (e.g., access tokens), and may include infrastructure as code (IaC) tools such as Terraform to automate the process of creating, updating, and managing the specified infrastructure across various cloud providers or on-premises environments.

The cloud security platform 200 includes gateways 250 that are deployed into various integration points, such as cloud providers. The gateways 250 an ingress and egress points of the cloud security platform 200 and are configured to monitor traffic, provide information to the controller 210, dynamically scale based on the cloud security platform 200, and provide security to a customer's cloud infrastructure. For example, gateways 250 may implement a transparent forward and reverse proxy to manage traffic. The gateways 250 may also include a cloud-based firewall that is configured to filter malicious traffic using various dynamic detection policies.

The cloud security platform 200 also integrates into various third-party services 252 for various purposes such as receiving threat-related intelligence (e.g., Spunk, Talos, etc.). The third-party services 252 also include different types of infrastructure components such as managing mobile devices, implementing cloud-based multimedia communication services, business analytics, network analytics (e.g., reverse address lookup), certificate services, security information and event management (SIEM), and so forth.

Figure 3:
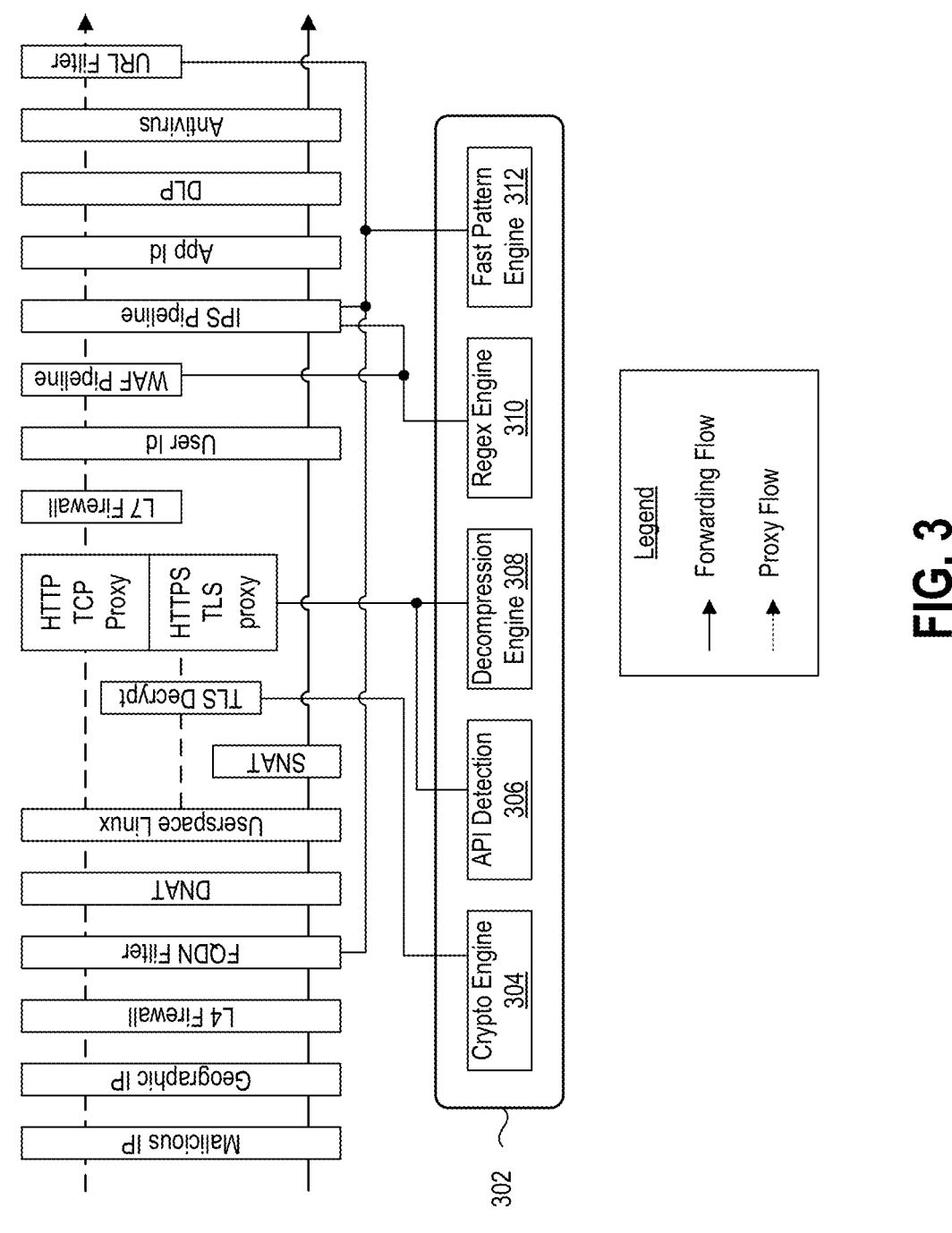
FIG. 3 illustrates a block diagram of a data path pipeline 300 and integration with hardware in accordance with some aspects of the disclosure.

FIG. 3 illustrates a block diagram of a data path pipeline 300 and integration with hardware in accordance with some aspects of the disclosure.

In some aspects, the data path pipeline 300 comprises a single-pass firewall architecture that uses a single-pass flow without expensive context switches and memory copy operations. In a single-pass flow, processing is not duplicated multiple times on a packet. For example, TCP/IP receive and transmission operations are only performed a single time. This is different from existing next-generation firewalls (NGFW). The data path pipeline 300 uses fibers with flexible stages completely running in user-space and, therefore, does not incur a penalty for kernel-user context switches, which are expensive in high bandwidth and low latency operations. The data path pipeline 300 provides advanced web traffic inspection comparable to WAFs to secure all traffic flows and break the attack kill chain in multiple places, raising the economic costs for attackers. The data path pipeline 300 also captures packets of live attacks into a cloud storage bucket without significant performance degradation and enables a rule-based capture on a per-session and attack basis.

The data path pipeline 400 is also configured to be flexible and stages of processing are determined on a per-flow basis. For example, application 1 to application 2 may implement an L4 firewall and IPS inspection, application 3 to application 4 may implement an L4 firewall, a transport layer security (TLS) proxy, and IPS, and an internet client to web application 5 implements an L4 firewall, TLS proxy, IPS, and WAF.

In some aspects, the data path pipeline 300 includes various filters (e.g., malicious IP filter), geographic IP filter, fully qualified domain name (FQDN) filter) to filter both forwarding flows and proxy flows, as well as an L4 firewall to restrict traffic based on conventional techniques.

The data path pipeline 300 may also be integrated with a hardware offload 302 (e.g., a field programmable gate arrays (FPGA) of a cloud provider, an application specific integrated circuit (ASIC), etc.) that includes additional functionality that does not impact throughput. In one aspect, a cloud provider may offer a hardware offload or an accelerator function to implement a specialized function. For example, the hardware offload 302 includes a cryptographic engine 304, an API detection engine 306, a decompression engine 308, a regex engine 310, and a fast pattern engine 312 to offload operations into hardware.

In one aspect, the data path pipeline 300 includes high throughput decryption and re-encryption to enable inspection of all encrypted flows using the cryptographic engine 304. By contrast, traditional NGFWs provide a throughput of around 10% for inspecting encrypted flows. The data path pipeline 300 may use a decompression engine 308 to decrypt compressed traffic and perform deep packet inspection. For example, the data path pipeline 300 also uses a userspace Linux TCP/IP driver, in addition to network address translation (NAT) in conjunction with the API detection engine 306 and the decompression engine 308 to eliminate problematic and malicious flows.

The data path pipeline 300 includes a transparent reverse and forward proxy to isolate clients and servers without exposing internal details, a layer 7 firewall to rate limit and protect applications and APIs, and secure user access by looking up end-user-specific identity from an identity provider (IDP) and provide zero trust network access (ZTNA). The data path pipeline 300 includes a WAF pipeline and an IPS pipeline to detect malicious and problematic flows in conjunction with a regex engine 310 and a fast pattern engine 312. For example, the WAF pipeline may implement protection for web applications, including OWASP Top 10, using a core ruleset and application-specific rules for frameworks and common content management tools like PHP, Joomla, and WordPress. The data path pipeline 300 includes IDS and IPS to block known vulnerabilities and provide virtual patching until the applications can be patched with updated security fixes, application identification to block traffic based on client, server or application payload, DLP loss and filtering, URI filtering, antivirus and anti-malware features to prevent malware files from being transferred for ingress (malicious file uploads), east-west lateral attacks (moving toolkits) and egress flows (e.g., botnets).

Figure 4:
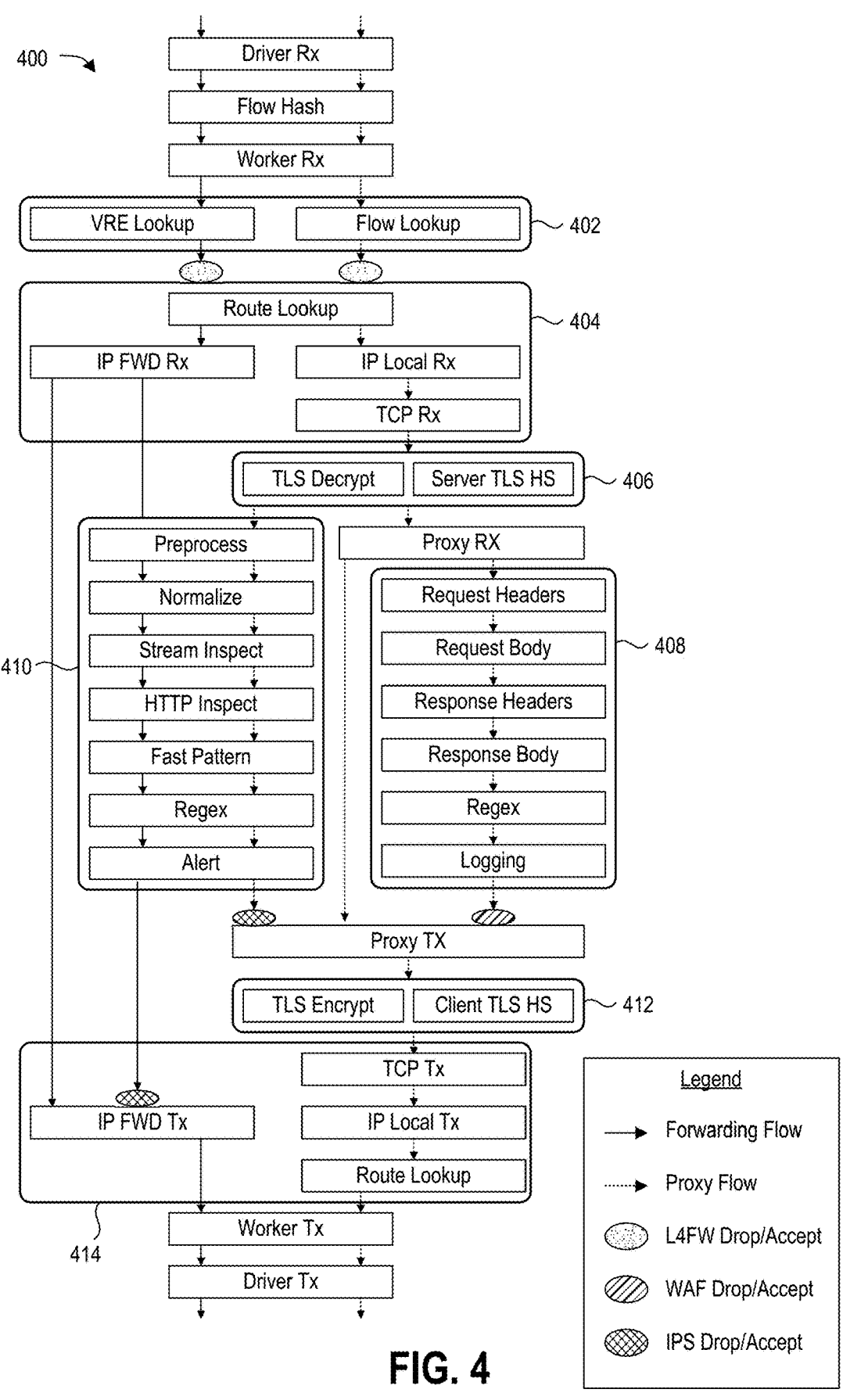
FIG. 4 illustrates a data path pipeline for forward packet flows and proxy packet flow of a cloud security platform in accordance with some aspects of the disclosure.

FIG. 4 illustrates a data path pipeline 400 for forward packet flows and proxy packet flow of a cloud security platform in accordance with some aspects of the disclosure.

The data path pipeline 400 comprises a L4 firewall 402, a user space receive TCP/IP stack 404, a TLS receive proxy 406, a WAF 408, an IPS 410, a TLS transmit proxy 412, and a user space transmit TCP/IP stack 414 and illustrates the flow of forwarding flows and proxy flows, and points at which packets may be dropped/accepted using an L4 firewall, a WAF, and/or IPS.

For example, the data path pipeline 400 may be implemented as a user-space driver (e.g., a data path packet driver (DPDK) that receives forwarding and proxy flows, computes hashes, and provides the packet to the worker. In this case, a worker is part of a distributed instance of a gateway and provides the flows to the L4 firewall 402. For example, the L4 firewall 402, or a transport layer firewall, may inspect traffic and filter traffic based on source and destination IP/port.

The user space receives TCP/IP stack 404 is configured to perform the receive processing of forwarding and proxy flows. For example, the user space receive TCP/IP stack 404 handles framing, addressing, and error detection within TCP/IP and further identifies per-flow processing based on policies and rules of the cloud security platform. For example, some forwarding flows are provided to the user space transmit TCP/IP stack 414, some forwarding flows are provided to the IPS 410, and proxy flows are forwarded to the TLS receive proxy 406. The TLS receive proxy 406 manages the TLS decryption process in the event further inspection is warranted based on the policies and rules, and then provides the proxy flows to either the IPS 410 or the WAF 408 based on a policy.

The IPS 410 examines its content, headers, and contextual information. Deep packet inspection involves analyzing the payload and looking for patterns, signatures, or anomalies that may indicate malicious activity. The IPS compares the packet against a database of known attack signatures and employs heuristic analysis to detect deviations from expected behavior. Additionally, it assesses factors such as source and destination addresses, ports, and protocol compliance. If the IPS identifies a packet as potentially malicious, it can take proactive measures, such as blocking the packet, alerting administrators, or initiating predefined security policies to prevent the exploitation of vulnerabilities and safeguard the network from intrusion attempts.

The WAF 408 monitors, filters, and analyzes HTTP traffic in real-time and actively looks for and blocks common web vulnerabilities such as SQL injection, XSS, and other application-layer attacks. By examining and validating HTTP requests and responses, the WAF can detect and block malicious traffic, ensuring that only legitimate requests reach the web application. WAFs often employ rule-based policies, signature-based detection, and behavioral analysis to identify and mitigate potential security risks.

The TLS transmit proxies 412 reassembles the proxy flows and contextual information and provides the proxy flows to the user space transmit TCP/IP stack 414, which reassembles the packet and forwards any traffic. As shown in FIG. 4, flows can be dropped at different points identified in the user space receive TCP/IP stack 404, after the WAF 408 or the IPS 410, or in the user space receive user space transmit TCP/IP stack 414.

Figure 5:
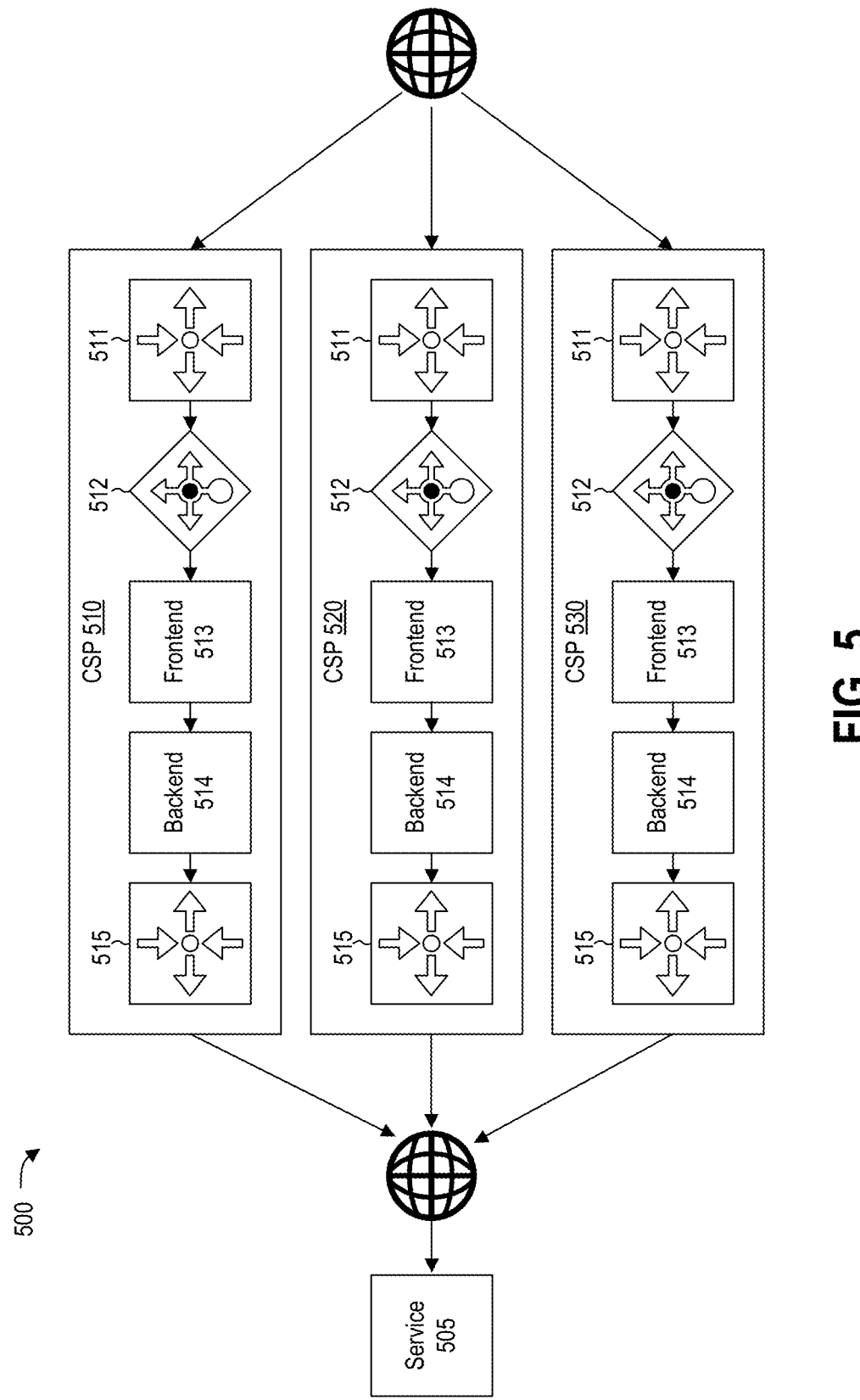
FIG. 5 is a conceptual diagram illustrating a cloud security platform integrated into a multi-cloud service in accordance with some aspects of the disclosure.

FIG. 5 is a conceptual diagram 500 illustrating a cloud security platform integrated into a multi-cloud service in accordance with some aspects of the disclosure. In some aspects, a service 505 may be geographically distributed and implemented using multiple CSPs. The CSPs can be distributed for many different reasons, for example a particular CSP does not have service available in particular countries. In other aspects, the CSPs may not be distributed geographically to a sufficient extent. Pricing can also be a concern, with lower cost alternatives being available in high-bandwidth regions. For at least these reasons, the service 505 may be distributed across CSP 510, CSP 520, and CSP 530 in this example.

Each service distributed across CSP 510, the CSP 520, and the CSP 530 may include an ingress gateway 511, a load balancer 512, a frontend 513, a backend 514, and an egress gateway 515. In some aspects, the ingress gateway 511 and the egress gateway 515 may be provided by the cloud security platform and provide an agnostic interface to control flows into each different CSP. For example, the cloud security platform can scale resources in a consistent manner, provide malicious content filtering, attack denial, rate limiting, and other services to protect the service 505 at the corresponding CSP. The cloud security platform can also perform the corresponding services to a recipient of the service (not shown).

The cloud security platform abstracts specific details associated with each CSP into a single interface and allows an administrator of the service 505 a common control plane for controlling resources within each CSP and protecting services within each CSP and the service 505.

Figure 6:
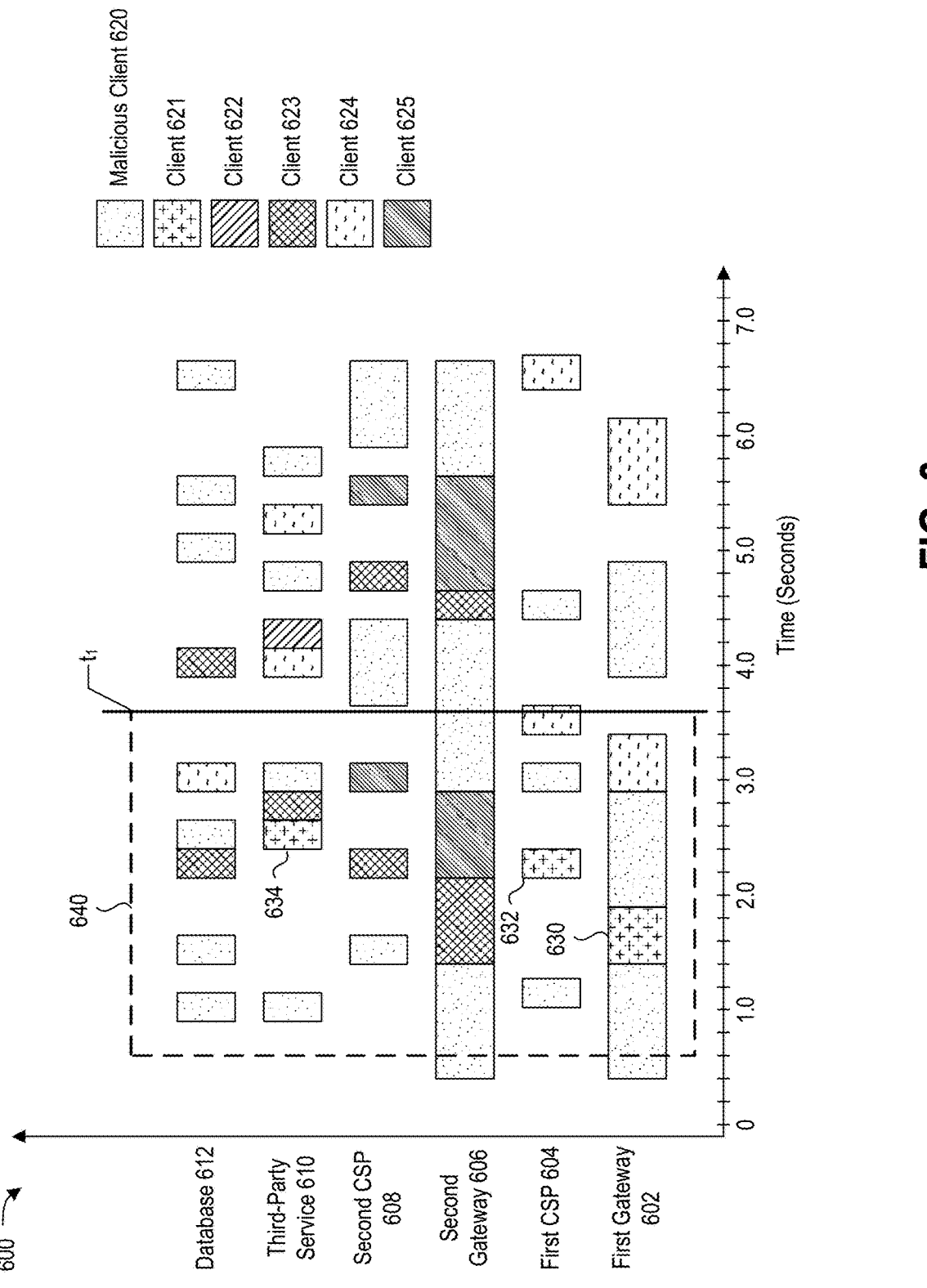
FIG. 6 is a swim lane diagram illustrating network activity associated with the multi-cloud security platform in accordance with some aspects of the disclosure.

FIG. 6 is a swim lane diagram 600 illustrating network activity associated with the multi-cloud security platform in accordance with some aspects of the disclosure. As further described below, a controller or other components of the multi-cloud security platform such as a log synthesis engine are configured to perform online collection of network data and synthesis based on dynamic cloud address mechanisms.

In some aspects, the multi-cloud security platform is deployed across different CSPs and includes network nodes within the different CSPs. For example, the multi-cloud security platform includes a first gateway 602 that is configured in a private network (e.g., a VPC) in a first CSP 604, a second gateway 606 that is configured in a private network of a second CSP 608. The swim lane diagram 600 also illustrates that at least one third-party service 610 can be integrated with the multi-cloud security platform. The network activity can also include internal components such as activity within a database 612.

Further, the swim lane diagram 600 illustrates network traffic and flow information associated with different clients over time, such as malicious client 620, client 621, client 622, client 623, client 624, and client 625. In this case, some clients only provide network traffic through a single CSP. For example, client 621 and client 624 provide traffic through the first gateway 602. The gateway 602 and its corresponding functions (e.g., firewall, unified forward and reverse proxy) process and record the traffic of various clients. In addition, the system can obtain (e.g., receive or request) information from the CSP itself.

For example, the multi-cloud security platform may obtain network data 630 of the client 621 from 1.4 seconds to 1.8 seconds (e.g., a binary download, etc.), and obtain network flow information 632 from the first CSP 604. For example, the first CSP 604 may collect network flow information of the network data 630 within the VPC. Network flow information identifies the movement of data packets between a source and a destination within a computer network, including various attributes such as packet headers, routing information, metadata, and session-related details, which are used to manage and optimize network performance, ensure security, and diagnose network-related issues within the CSP. The first gateway 602 may also provide some additional processing to mitigate internal issues of the first CSP 604 (e.g., prevent cross-site request forgery, validate tokens, etc.). The multi-cloud security platform can either request this data from the first CSP 604, or may set up a persistent connection (e.g., a socket connection) with the first CSP 604 for bidirectional communication.

In some aspects, the multi-cloud security platform may the at least one third-party service 610 for security, network, content and other purposes. For example, the multi-cloud security platform may use the third-party service 610 to perform domain lookups, identify traffic origination, or receive information pertinent to the traffic. In another example, the third-party service 610 may provide information to the multi-cloud security platform in connection with current threats. In one example, a security service (e.g., Splunk) may ingest and index data from the multi-cloud security platform in real-time to allow the multi-cloud security platform to monitor network communications entering and leaving the multi-cloud security platform and can provide real-time information 634 to the multi-cloud security platform. The real-time information can include various information that provides information relevant to security (e.g., a reboot to install a rootkit).

The multi-cloud security platform may also include components that generate additional data that can be synthesized with other sources of data. In one aspect, the database 612 can provide information.

The volume of data produced by the different CSPs, gateways, and third-party services cannot be stored in local mediums. However, accessing the event post-execution (e.g., after the events are stored) and performing cross-references at that time is inaccurate because the cloud is dynamic. For example, services can dynamically scale resources and IP addresses can be assigned to different at different times, and the logs stored to a persistent storage can inaccurately identify resources.

In some aspects, the multi-cloud security platform includes a dynamic log synthesis engine for caching log data and enriched data in the logs based on cross-referencing and synthesizing different sources of data. For example, the dynamic log synthesis engine can store a portion of data and then perform various functions, such as using a country of origin or other supplement information from a third-party service, combine runtime information known by the multi-cloud security platform, and generate enriched data. The multi-cloud security platform can use runtime information, such as IP addresses of each gateway, to map dynamic information (e.g., an identification of a cluster that the getaway is a member of) to information from different sources. For example, a tag or other alias identifying the configuration of the gateway is known to the multi-cloud security platform and can be applied to the log entry based on the IP address. This example is not possible post-execution because the IP address of the data source (e.g., the first gateway 602) is dynamic and may have changed.

The multi-cloud security platform uses multiple caches of data to cache information and map data and events from different sources into a single log entry. For example, the multi-cloud security platform can have a cache associated with each data source (e.g., the first gateway 602, the first CSP 604, the second gateway 606, the second CSP 608, and third-party service 610). Caches can also exist to memorize semi-persistent resources, such as policies, session tokens, IP addresses, etc. For example, FIG. 6 illustrates a static window 640 that identifies a period of time data is stored within a cache and one or more log entries are synthesized based on the cumulative events across the different resources. In some cases, a dynamic window can be configured to ensure that a pertinent event is maintained for the duration of the event (e.g., an attack).

For example, a malicious client 620 may be using a distributed attack and sending attack resources through different CSPs in a multi-cloud application or network monitored by the multi-cloud security platform. The multi-cloud security platform may be configured to identify traffic in different resources that are associated with the malicious client 620 using different techniques. For example, the third-party service 610 may provide a security alert (e.g., identification of a new zero-day vulnerability) to the multi-cloud security platform, which may be configured to generate policies for identifying and mapping the data corresponding to the attack. The multi-cloud security platform can identify the attack across different resources and generates information within one or more synthesized log entries that can be used in post-execution analysis. For example, the multi-cloud security platform may determine if an attack successfully circumnavigated a security policy, was directed to a honeypot, or other final disposition.

Although FIG. 6 illustrates that the static window 640 comprises data over a period of 3.0 seconds, the static window 640 is provided for demonstrative purposes and is non-limiting. The static window 640 can last for significantly longer periods of time and balances requirements for memory consumption and processing time based on the multi-cloud security platform configuration.

Figure 7:
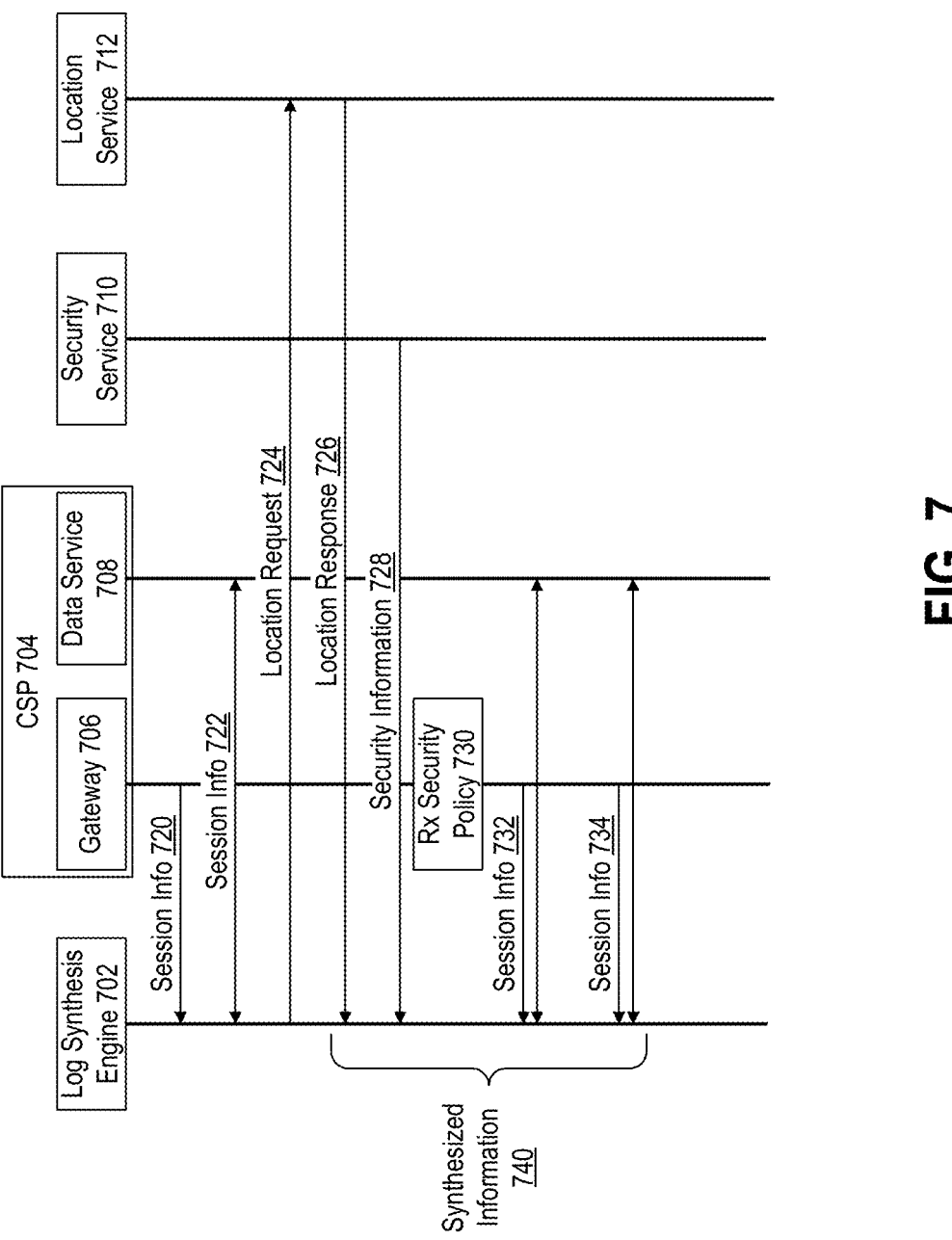
FIG. 7 illustrates a sequence diagram performed by a log synthesis engine of the multi-cloud security platform in accordance with some aspects of the disclosure.

FIG. 7 illustrates a sequence diagram performed by a log synthesis engine 702 of the multi-cloud security platform in accordance with some aspects of the disclosure. In some aspects, the log synthesis engine 702 is executed in conjunction with a controller (e.g., the controller 210 of FIG. 2) that provides a central control plane for functions distributed across multiple CSPs, such as CSP 704. The CSP 704 includes at least one gateway 706 associated with a cluster. The gateway 706 is configured to receive traffic (e.g., from a sprayer) and process the traffic based on various information. The CSP 704 may include a data service 708 for surfacing information such as logs, events, and other information based on an API or other corresponding communication interface. The log synthesis engine 702 may also be configured to interface, either directly or indirectly (e.g., via the controller 210), with various services such as a security service 710 and a location service 712 (e.g., the at least one third-party service 610 in FIG. 6).

In some aspects, the log synthesis engine 702 may receive session information 720 from the gateway 706 based on various sessions associated with user traffic, either ingress or egress, at the gateway 706. For example, the gateway 706 may be configured as an egress firewall and configured to prevent data exfiltration. The log synthesis engine 702 may receive session information 720 may include various information such as events that are aggregated based on client sessions (e.g., a session token) to the log synthesis engine 702. The data service 708 may also send session information 722 to the log synthesis engine 702. In one example, the log synthesis engine 702 may send a location request 724 to the location service 712 to identify a geographical country of origin of traffic of various clients of the gateway 706. The log synthesis engine 702 may receive a location response 726 that identifies a country origin, which the log synthesis engine 702 can then map to different session information based on an IP address or other unique identifiers (e.g., a FQDN, etc.).

In some cases, the security service 710 is configured to provide various security information 728 to the log synthesis engine 702. For example, the security service 710 may provide various security information 728 including alerts, reports, configuration details, and metadata to facilitate data analysis, monitoring, and decision-making processes at the multi-cloud security platform. For example, the gateway 706 may receive a security policy at block 730 that includes one or more policies to implement. In some cases, changing a security posture (e.g., implementing a security policy) may trigger the multi-cloud security platform to record data from a cache as one or more synthesized log entries to identify a change event that can be directly compared.

For example, after the security policy is received, the log synthesis engine 702 may receive session information 732 at a first time and session information 734 at a second time and combine the various information as synthesized information 740. The log synthesis engine 702 thereby synthesizes different events that are not necessarily aligned in time based on a cache. Caching the data over a period of time enables the log synthesis engine 702 to align the events based on information known to the log synthesis engine 702 (e.g., an identifier associated with a configuration of the gateway 706) to provide log data that is enriched from multiple sources with accurate static information that identifies resources. For example, the synthesized information 740 can include information that identifies that the security policy was applied at block 730, thereby enabling an analysis of the synthesized logs to compare performance metrics based on the security policy. In some other aspects, the log synthesis engine 702 can also compare performance of policy changes across different CSPs to identify differences in performance, security, and other metrics. In some cases, systems and techniques can use the various metrics based on machine or human analysis to optimize performance and security in an accurate matter.

In other aspects, services in clouds can generate massive amounts of usage data (e.g., measured in petabytes) and the log synthesis engine 702 can ensure that data is synthesized in real-time to improve post-execution analysis. The log synthesis engine 702 also ensures that internal data (e.g., an identifier of a configuration, security policies, etc.) of the multi-cloud security platform is accurately mapped to different data sources in real time.

FIG. 8 is a conceptual illustration of an example of synthesized data 800 in accordance with some aspects of the disclosure. As shown, the synthesized data 800 includes various relevant information associated with the network flow such as timestamps or durations (e.g., the duration of a network flow), source addresses, destination addresses, resource configuration, request type, source origination, security-related posture, information related to potential downstream effects such as a database, identify of relevant CSPs, accumulated information such as the number of requests, and internal information determined by the multi-security cloud platform.

For example, the multi-cloud security platform can synthesize and group requests across different data fields, such as destination IP address subsets. The multi-cloud security platform can also perform deep packet inspection at line rate and may be able to, for example, identify network protocol (e.g., HTTP) and request type (e.g., HTTP post, HTTP get, HTTP put, etc.). The synthesized data 800 also injects internal information known by the multi-cloud security platform into the synthesized data 800. Non-limiting examples of the synthesized data 800 also inject internal information such as firewall configuration, gateway policy applied to the traffic, security postures, attestation information, and so forth.

The multi-cloud security platform may also use third-party service data 804 to enrich the synthesized data 800 without requiring additional post-execution processing, which can be inaccurate. For example, the identity of the resources in a particular CSP may no longer be available.

The multi-cloud security platform may also be configured to perform various analyses on network traffic and provide information pertaining to the traffic to assist in filtering the traffic. For example, the network traffic at timestamp 0297 is denied because the multi-cloud security platform may detect a cross-site injection, a forged resource (e.g., token), and so forth. In this example, the multi-cloud security platform can identify corresponding attacks spread across different CSPs. In another example at timestamp 0298, the multi-cloud security platform can detect network traffic at timestamp 0298 can detect a null value in any array or some other characteristic that may be indicative of an attack, and then deny the traffic.

The multi-cloud security platform can also combine include synthesized information 806 which is a combination of data from different sources that are mapped into one or more fields. For purposes of illustration, the synthesized information 806 is a confidence that the network flow is associated with benign traffic based on a determination associated by components of the multi-cloud security platform. For example, the cross-site injection detected at timestamp 2097 has a high probability that the network flow of malicious traffic and therefore has a low confidence of benign traffic. The multi-cloud security platform can use the synthesized information 806 to make various determinations in other components, such as logging traffic, performing additional inspections, and other security-aware rules.

FIG. 9 illustrates an example method for high-fidelity event data for multi-cloud services in accordance with some aspects of the disclosure. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence. Although a computing device (e.g., using the system-on-chip (SoC) 1000, etc.) is described as performing the method, this example is for descriptive purposes. The method may be performed in a distributed manner using cloud computing, various containers, micro-services, and other techniques. In some aspects, the computing system described in FIG. 11 comprises functionality associated with a controller of the cloud security platform.

In some aspects, the computing system may be a controller (e.g., the controller 210) configured to deploy services and firewalls in a multi-cloud application. In other aspects, the computing system can be a separate device or service that is provisioned to assist the controller 210. For example, the control may be a Kubernetes for dynamically scaling one or more services (e.g., the log synthesis engine 702) for assisting the multi-cloud security platform.

At block 902, the computing system may store first event information of a multi-cloud service in a cache. In some aspects, the first event information is received from a first gateway controlled by the controller. For example, the controller may allocate a new controller based on a volume of traffic, and the new controller may have a dynamic IP address.

At block 904, the computing system may store second event information of the multi-cloud service in the cache. The second event information is received from a first external service. For example, the first external service can provide a country of origin of the traffic (e.g., based on IP address) or other metadata within the packet (e.g., the identification of various servers in the packet headers).

At block 906, the computing system may map the second event information to the first event information to at least one identifier associated with the controller. For example, the identifier may be associated with a configuration or other information that can be used to directly or indirectly identify a configuration of the gateway.

At block 908, the computing system may generate a first synthesized event information based on mapping the second event information to the first event information. In some aspects, the first synthesized event information includes the at least one identifier, at least one event from the first event information, and at least one event from the second event information. As described above, the event information can come from different resources such as different CSPs, different third-party services, and so forth.

In some aspects, the computing system, after the first synthesized event information is generated, may receive third event information from a second external service and update the first synthesized event information based on information in the third event information.

In another aspect, the computing system may retrieve supplemental information based on the first event information and the second event information. For example, the supplemental information is associated with a security assessment of a source or a destination of the first event information and the second event information. The computing system may update the first synthesized event information based on the supplemental information.

In one example, the second event information is applied to a second synthesized event information that has a timestamp that is before a timestamp of the first synthesized event information and a third synthesized event information that has a timestamp that is after the timestamp of the first synthesized event information. In another example, the second event information is applied to a second synthesized event information that has a timestamp that is before a timestamp of the first synthesized event information and a third synthesized event information that has a timestamp that is after the timestamp of the first synthesized event information.

In some aspects, the computing system may generate a security recommendation based on synthesized event information. The security recommendation can be an activity for the gateway to take (e.g., deny, permit, warn, etc.).

At block 910, the computing system may, after a period of time, store the first synthesized event information in a storage system.

At block 912, the computing system may, when the first synthesized event is stored, remove the first event information, the second event information, and the first synthesized event information from the cache. For example, the computing system can continue to supplement the synthesized event data based on further changes during a time period. In some cases, this time period can be based on a triggering event, such as when a new policy is applied to the traffic corresponding to the first synthesized event. In other cases, the time period can be a fixed period (e.g., 60 seconds) or a dynamic period (e.g., when the event is deemed to have changed state, such as ending the event).

In some aspects, the computing system may identify a dynamic address in the first event information and map the dynamic address to configuration information. For example, the dynamic address is a cloud-based IP address that is dynamically assigned at runtime. The controller the configuration information to the first gateway. The controller also provides an identifier of the configuration information (e.g., a text identifier such as a name of the configuration, etc.) to the computing system. The first synthesized event information may include an identifier associated with the configuration information. For example, the first synthesized event information identifies at least one security policy applied to the first gateway by the controller.

Figure 10:
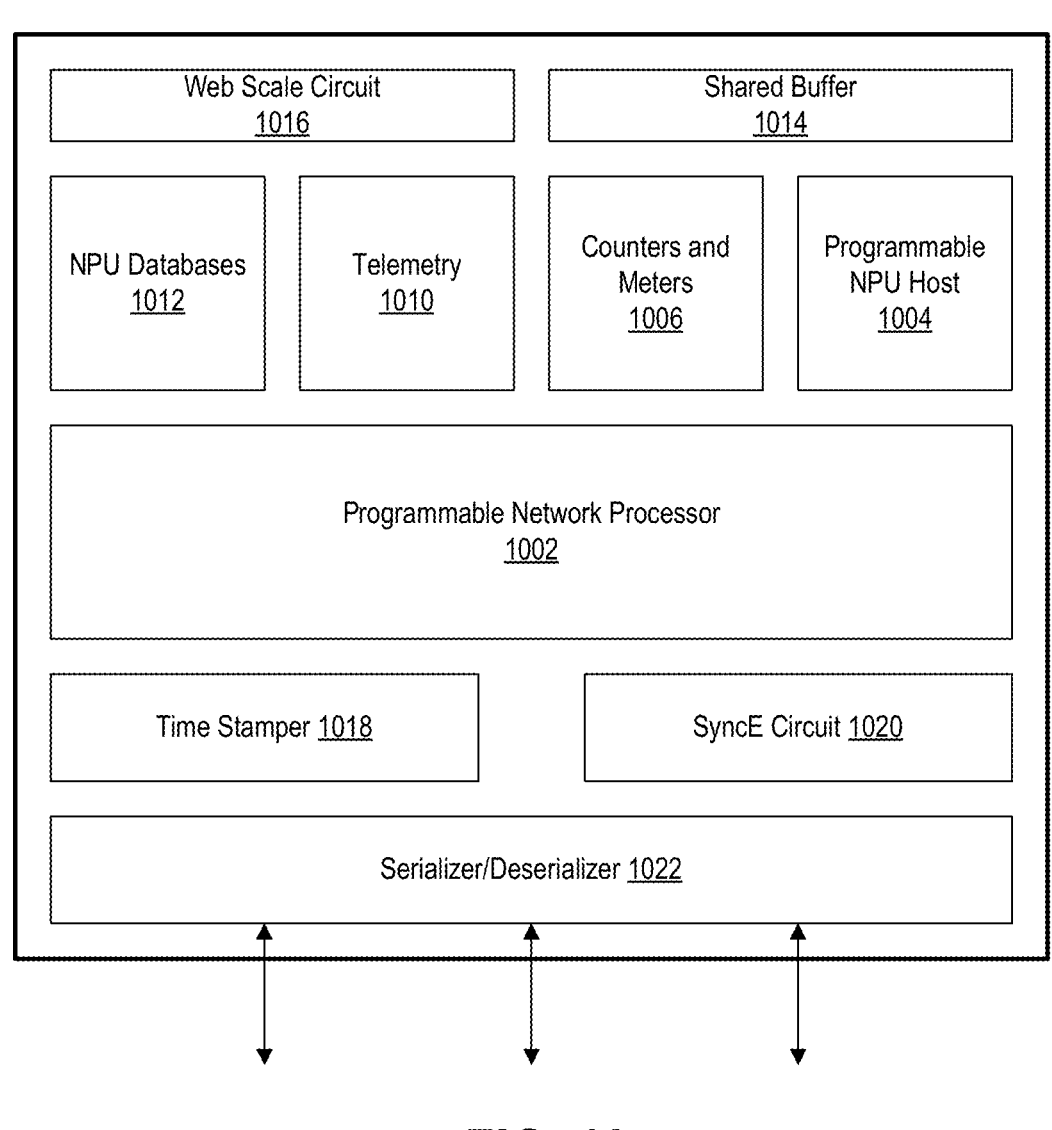
FIG. 10 illustrates a block diagram of a system-on-chip (SoC) used in a network device to perform various functions in hardware in accordance with various aspects of the disclosure.

FIG. 10 illustrates a block diagram of an SoC 1000 in a network device to perform various functions in hardware in accordance with various aspects of the disclosure. For example, the SoC 1000 may include fixed hardware components and programmable hardware components to perform various network tasks. In one illustrative aspect, the SoC 1000 includes a programmable network processor 1002 (e.g., a network processing unit (NPU), etc.), a programmable NPU host 1004, counters and meters 1006, telemetry 1010, an NPU database 1012, a shared buffer 1014, a web scale circuit 1016, a time stamper 1018, a synchronous Ethernet (SyncE) circuit 1020, and a serializer/deserializer 1022. In some cases, the SoC 1000 may be configured to execute bytecode instructions to be supplemented with additional functions. For example, the SoC 1000 may be configured to execute various functions described above.

The programmable network processor 1002 may be programmed to perform functions that are conventionally performed by integrated circuits (IC) that are specific to switching, routing line card, and routing fabric. The programmable network processor 1002 may be programmable using the programming protocol-independent packet processors (P4) language, which is a domain-specific programming language for network devices for processing packets. The programmable network processor 1002 may have a distributed P4 NPU architecture that may execute at a line rate for small packets with complex processing. The programmable network processor 1002 may also include optimized and shared NPU fungible tables. In some aspects, the programmable network processor 1002 supports a unified software development kit (SDK) to provide consistent integrations across different network infrastructures and simplifies networking deployments. The SoC 1000 may also include embedded processors to offload various processes, such as asynchronous computations.

The programmable network processor 1002 includes a programmable NPU host 1004 that may be configured to perform various management tasks, such as exception processing and control-plane functionality. In one aspect, the programmable NPU host 1004 may be configured to perform high-bandwidth offline packet processing such as, for example, operations, administration, and management (OAM) processing and MAC learning.

The SoC 1000 includes counters and meters 1006 for traffic policing, coloring, and monitoring. As an example, the counters and meters 1006 include programmable counters used for flow statistics and OAM loss measurements. The programmable counters may also be used for port utilization, microburst detection, delay measurements, flow tracking, elephant flow detection, congestion tracking, etc.

The telemetry 1010 is configured to provide in-band telemetry information such as per-hop granular data in the forwarding plane. The telemetry 1010 may observe changes in flow patterns caused by microbursts, packet transmission delay, latency per node, and new ports in flow paths. The NPU database 1012 provides data storage for one or more devices, for example, the programmable network processor 1002 and the programmable NPU host 1004. The NPU database 1012 may include different types of storage, such as key-value pair, block storage, etc.

In some aspects, the SoC 1000 includes a shared buffer 1014 that may be configured to buffer data, configurations, packets, and other content. The shared buffer 1014 may be utilized by various components such as the programmable network processor 1002 and the programmable NPU host 1004. A web scale circuit 1016 may be configured to dynamically allocate resources within the SoC 1000 for scale, reliability, consistency, fault tolerance, etc.

In some aspects, the SoC 1000 may also include a time of day (ToD) time stamper 1018 and a SyncE circuit 1020 for distributing a reference to subordinate devices. For example, the time stamper 1018 may support IEEE-1588 for ToD functions. In some aspects, the time stamper 1018 includes support for a precision timing protocol (PTP) for distributing frequency and/or phase to enable subordinate devices to synchronize with the SoC 1000 for nano-second level accuracy.

The serializer/deserializer 1022 is configured to serialize and deserialize packets into electrical signals and data. In one aspect, the serializer/deserializer 1022 supports sending and receiving data using non-return-to-zero (NRZ) modulation or pulse amplitude modulation 4-level (PAM4) modulation. In one illustrative aspect, the hardware components of the SoC 1000 provide features for terabit-level performance based on flexible port configuration, nanosecond-level timing, and programmable features. Non-limiting examples of hardware functions that the SoC 1000 may support include IP tunneling, multicast, NAT, port address translation (PAT), security and quality of service (QoS) access control lists (ACLs), equal cost multiple path (ECMP), congestion management, distributed denial of service (DDos) migration using control plane policing, telemetry, timing and frequency synchronization, and so forth.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1100 includes at least one processing unit (a central processing unit (CPU) or processor) 1110 and connection 1105 that couples various system components including system memory 1115, such as ROM 1120 and RAM 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/ LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another IC chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the processes described herein (e.g., method 900, and/or other process described herein) may be performed by a computing device or apparatus. In one example, the method 900 can be performed by a computing device having a computing architecture of the computing system 1100 shown in FIG. 11.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, graphical processing units (GPUs), digital signal processors (DSPs), CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an ASIC, FPGAs, or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of synthesizing logs from different clouds and services of a multi-cloud service, comprising:
   storing first event information of the multi-cloud service in a cache, wherein the first event information is received from a first gateway controlled by a controller;
   storing second event information of the multi-cloud service in the cache, wherein the second event information is received from a first external service;
   mapping the second event information to the first event information by identifying a dynamic address in the first event information and associating the dynamic address with configuration information provided by the controller, wherein the configuration information includes at least one identifier associated with the first gateway; and
   generating a first synthesized event information based on mapping the second event information to the first event information, the first synthesized event information including the at least one identifier, at least one event from the first event information, and at least one event from the second event information.

2. The method of claim 1, further comprising:
   after the first synthesized event information is generated, receiving third event information from a second external service; and
   updating the first synthesized event information based on information in the third event information.

3. The method of claim 1, further comprising:
   after a period of time, storing the first synthesized event information in a storage system; and
   when the first synthesized event information is stored, removing the first event information, the second event information, and the first synthesized event information from the cache.

4. The method of claim 1, further comprising:
   retrieving supplemental information based on the first event information and the second event information, wherein the supplemental information is associated with a security assessment of a source or a destination of the first event information and the second event information; and
   updating the first synthesized event information based on the supplemental information.

5. The method of claim 4, wherein the second event information is applied to a second synthesized event information that has a timestamp that is before a timestamp of the first synthesized event information and a third synthesized event information that has a timestamp that is after the timestamp of the first synthesized event information.

6. The method of claim 1, further comprising:
    generating a security recommendation based on synthesized event information.

7. The method of claim 1, wherein the first synthesized event information identifies at least one security policy applied to the first gateway.

8. A computing device for performing a function, comprising:
    at least one memory; and
    at least one processor coupled to the at least one memory and configured to:
        store first event information of a multi-cloud service in a cache, wherein the first event information is received from a first gateway controlled by a controller;
        store second event information of the multi-cloud service in the cache, wherein the second event information is received from a first external service;
        map the second event information to the first event information by identifying a dynamic address in the first event information and associating the dynamic address with configuration information provided by the controller, wherein the configuration information includes at least one identifier associated with the first gateway; and
        generate a first synthesized event information based on mapping the second event information to the first event information, the first synthesized event information including the at least one identifier, at least one event from the first event information, and at least one event from the second event information.

9. The computing device of claim 8, wherein the at least one processor is configured to:
    after the first synthesized event information is generated, receive third event information from a second external service; and
    update the first synthesized event information based on information in the third event information.

10. The computing device of claim 8, wherein the at least one processor is configured to:
    after a period of time, store the first synthesized event information in a storage system; and
    when the first synthesized event information is stored, remove the first event information, the second event information, and the first synthesized event information from the cache.

11. The computing device of claim 8, wherein the at least one processor is configured to:
    retrieve supplemental information based on the first event information and the second event information, wherein the supplemental information is associated with a security assessment of a source or a destination of the first event information and the second event information; and
    update the first synthesized event information based on the supplemental information.

12. The computing device of claim 11, wherein the second event information is applied to a second synthesized event information that has a timestamp that is before a timestamp of the first synthesized event information and a third synthesized event information that has a timestamp that is after the timestamp of the first synthesized event information.

13. The computing device of claim 8, wherein the at least one processor is configured to:
    generate a security recommendation based on synthesized event information.

14. The computing device of claim 8, wherein the first synthesized event information identifies at least one security policy applied to the first gateway.

15. A computing device for performing a function, comprising:
    a storage configured to store instructions; and
    a processor configured to execute the instructions and cause the processor to:
        store first event information of a multi-cloud service in a cache, wherein the first event information is received from a first gateway controlled by a controller;
        store second event information of the multi-cloud service in the cache, wherein the second event information is received from a first external service;
        map the second event information to the first event information by identifying a dynamic address in the first event information and associating the dynamic address with configuration information provided by the controller, wherein the configuration information includes at least one identifier associated with the first gateway; and
        generate a first synthesized event information based on mapping the second event information to the first event information, the first synthesized event information including the at least one identifier, at least one event from the first event information, and at least one event from the second event information.

16. The computing device of claim 15, wherein the processor is configured to execute the instructions and cause the processor to:
    after the first synthesized event information is generated, receive third event information from a second external service; and
    update the first synthesized event information based on information in the third event information.

17. The computing device of claim 15, wherein the processor is configured to execute the instructions and cause the processor to:
    after a period of time, store the first synthesized event information in a storage system; and
    when the first synthesized event information is stored, remove the first event information, the second event information, and the first synthesized event information from the cache.

18. The computing device of claim 15, wherein the processor is configured to execute the instructions and cause the processor to:
    retrieve supplemental information based on the first event information and the second event information, wherein the supplemental information is associated with a security assessment of a source or a destination of the first event information and the second event information; and
    update the first synthesized event information based on the supplemental information.

19. The computing device of claim 15, wherein the processor is configured to:
    generate a security recommendation based on synthesized event information.

20. The computing device of claim 15, wherein the first synthesized event information identifies at least one security policy applied to the first gateway.

\* \* \* \* \*